United States Patent
Joo

(10) Patent No.: US 8,504,095 B2
(45) Date of Patent: Aug. 6, 2013

(54) METHOD AND APPARATUS FOR SYSTEM ACQUISITION IN A MOBILE COMMUNICATION TERMINAL

(75) Inventor: Jae Seok Joo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1099 days.

(21) Appl. No.: 11/867,449

(22) Filed: Oct. 4, 2007

(65) Prior Publication Data

US 2008/0102825 A1 May 1, 2008

(30) Foreign Application Priority Data

Oct. 31, 2006 (KR) .................. 10-2006-0106502

(51) Int. Cl.
*H04W 4/00* (2009.01)
*H04W 24/00* (2009.01)
*G01S 19/00* (2010.01)

(52) U.S. Cl.
USPC .............. 455/550.1; 455/435.1; 455/457; 342/357.2

(58) Field of Classification Search .......... 455/452, 455/528, 434–435, 457; 342/357.2
See application file for complete search history.

(56) References Cited

U.S. PATENT DOCUMENTS

| | | | | |
|---|---|---|---|---|
| 6,167,274 | A * | 12/2000 | Smith | 455/456.3 |
| 6,415,148 | B1 * | 7/2002 | Chiniga et al. | 455/434 |
| 7,313,419 | B2 * | 12/2007 | Islam et al. | 455/574 |
| 2004/0192328 | A1 | 9/2004 | Giacalone et al. | |
| 2004/0235475 | A1 * | 11/2004 | Ishii | 455/435.3 |
| 2006/0049982 | A1 * | 3/2006 | Wells | 342/357.1 |

FOREIGN PATENT DOCUMENTS

| | | |
|---|---|---|
| CN | 1768542 | 5/2006 |
| WO | WO 2004/089031 | 10/2004 |
| WO | WO 2006/093961 | 9/2006 |

\* cited by examiner

*Primary Examiner* — Nizar Sivji
(74) *Attorney, Agent, or Firm* — The Farrell Law Firm, P.C.

(57) ABSTRACT

A method and an apparatus are provided for acquiring, in a reduced time, a system using location information in a mobile communication terminal. When a mobile communication terminal is turned on or disconnects with a base station, a Preferred Roaming List (PRL) is searched in order of closeness of a system to the current location of the mobile communication terminal. At predetermined time intervals, the systems of the PRL are arrayed in order of closeness of a system to the current location, and the arrayed PRL is searched. The present invention can reduce the time taken to acquire a system.

19 Claims, 3 Drawing Sheets

METHOD AND APPARATUS FOR SYSTEM ACQUISITION IN A MOBILE COMMUNICATION TERMINAL

PRIORITY

This application claims priority to an application entitled "METHOD AND APPARATUS FOR SYSTEM ACQUISITION IN A MOBILE COMMUNICATION TERMINAL" filed in the Korean Intellectual Property Office on Oct. 31, 2006 and assigned Serial No. 2006-0106502, the contents of which are incorporated herein by reference

BACKGROUND OF THE INVENTION

1. Field of the Invention

The present invention relates to a mobile communication terminal. Particularly, the present invention relates to a method and an apparatus for quickly acquiring a system using location information in a mobile communication terminal.

2. Description of the Related Art

In general, when a mobile communication terminal is turned on or disconnects with a base station in a mobile communication system, a Most Recently Used (MRU) list having information of the most recently connected system is searched for acquiring a system.

If the system is not acquired after the MRU list is searched, the mobile communication terminal searches a Preferred Roaming List (PRL) having information of systems being roamed to find the system to be acquired. The PRL includes a system ID (SID), a network ID (NID), a channel, and a Radio Frequency Band, classified by a geographic information index.

In a conventional method, when a system is disconnected, all systems in a PRL are searched in a predetermined order of the PRL until the system is acquired. That is, because the mobile communication terminal searches the PRL in the predetermined PRL order, an unnecessary search of systems that cannot be found at the current location may be performed. Therefore, a problem of slow acquisition of the actual system occurs and, consequently, may be inconvenient for a user. Also, another problem is an increased consumption of battery power due to an unnecessary system search.

SUMMARY OF THE INVENTION

The present invention has been made in an effort to solve the above problems, and provides a method and an apparatus for quickly acquiring a system using location information in a mobile communication terminal.

The present invention further provides a method and an apparatus for quickly acquiring a system using location information in a mobile communication terminal by arraying a PRL order on a regular basis.

According to an exemplary embodiment of the present invention, an apparatus for acquiring a system in a mobile communication terminal includes a Radio Frequency (RF) communication unit for transmitting and receiving a wireless radio frequency signal; a location signal receiver for receiving a location signal of the mobile communication terminal; a system list storage unit for storing a system list to be searched for acquiring a system; and a control unit for acquiring a system by searching the stored system list for a system having the closest system location to the current location of the mobile communication terminal calculated from the location signal received by the location signal receiver.

According to another exemplary embodiment of the present invention, a method for acquiring a system in a mobile communication terminal includes searching, upon turning on the mobile communication terminal, systems that were used most recently; calculating, if a system is not acquired by searching the most recently used systems, the current location of the mobile communication; searching the systems in order of closeness of a system to the calculated current location; and transforming, if a system is acquired by searching the systems, a state of the mobile communication terminal into an idle state.

According to another exemplary embodiment of the present invention, a method for acquiring a system in the mobile communication terminal includes searching, upon disconnecting with a base station, systems that were used most recently; searching, if a system is not acquired by searching the most recently used systems, systems to be roamed; calculating, if a system is not acquired by searching systems to be roamed, the current location of the mobile communication terminal; searching systems in order of closeness of a system to the calculated current location; and transforming, if a system is acquired, a state of the mobile communication terminal into an idle state.

BRIEF DESCRIPTION OF THE DRAWINGS

The objects, features and advantages of the present invention will be more apparent from the following detailed description in conjunction with the accompanying drawings, in which.

DETAILED DESCRIPTION OF PREFERRED EMBODIMENTS

Preferred embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
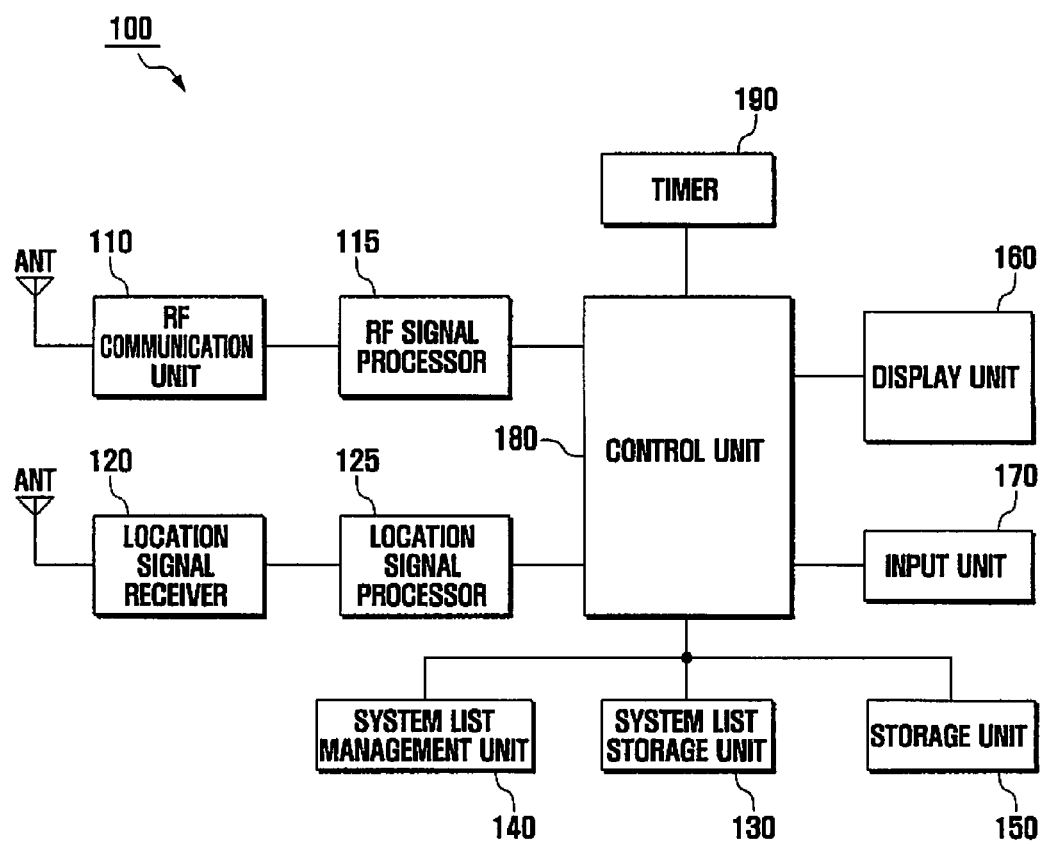
FIG. 1 is a block diagram illustrating a configuration of an apparatus for acquiring a system in a mobile communication terminal according to an exemplary embodiment of the present invention.

FIG. 1 is a block diagram illustrating a configuration of an apparatus for acquiring a system in a mobile communication terminal according to an exemplary embodiment of the present invention.

As shown in FIG. 1, a system acquisition apparatus 100 for acquiring a system in a mobile communication terminal according to the present invention includes a Radio Frequency (RF) communication unit 110 for transmission and reception of wireless radio frequency signals; a location signal receiver 120 for receiving location signals; a system list storage unit 130 for storing a system list to be searched for acquiring a system; a system list management unit 140 for arraying the stored system list based on the received location signals; a storage unit 150 for storing data; a display unit 160 for displaying image data and user information; an input unit 170 for input by a user; and a control unit 180 for controlling, in cooperation with the other units, the acquiring a system by searching for the closest system to the current location among the systems in the stored system list based on the received location signals.

The system acquisition apparatus 100 for acquiring a system further includes a timer 190 for to indicating when a predetermined time duration has elapsed, according to control of the control unit 180. The timer 190 in an alternative embodiment is included in the control unit 180.

The RF communication unit 110 preferably is an RF module and includes a local wireless communication module, such as an Infrared Data Association (IrDA) or a Bluetooth module. The system acquisition apparatus 100 further includes an RF signal processor 115 to process received RF signals. The RF signal processor 115 is in an alternative embodiment included in the RF communication unit 110.

The location signal receiver 120 is preferably a Global Positioning System (GPS) module and receives a location signal from a GPS satellite. The location signal receiver 120 stores location information into the storage unit 150 after receiving the location information, such as an ephemeris and an almanac of a GPS satellite or a Position Determination Entity (PDE) system. The almanac data is used to predict which satellites are nearby when looking for GPS signals. Almanac data includes a set of parameters for each GPS satellite that can be used to calculate approximate location in orbit. The ephemeris data is a set of parameters that can be used to accurately calculate the location of a GPS satellite at a particular point in time. The ephemeris data describes the path that the satellite follows when orbiting Earth.

The system list storage unit 130 stores a Most Recently Used (MRU) list and a Preferred Roaming List (PRL). The system list storage unit 130 determines a system location by using the PRL, which includes general information for acquiring a system, such as a System ID (SID), a network ID (NID), a channel, and a radio frequency band, as well as coordinate information, such as a latitude and a longitude of a system locating point. The MRU list and the PRL may be stored into the storage unit 150. The system list management unit 140 arrays systems of the PRL in order of closeness of the systems to a calculated current location of the system acquisition apparatus 100, under the control of the control unit 180. The array is preferably performed by location signals received by the location signal receiver 120 and by coordinate information of the system locating point included in the PRL. The array is preferably performed at regular time interval notified by the timer 190.

The storage unit 150 preferably includes the system list storage unit 130 as a partial area of the storage unit 150.

The display unit 160 preferably performs an input function in addition to a display function of information or data by incorporating a touch panel including the input unit 170.

The input unit 170 includes a key pad, preferably formed as a touch panel or a touch pad. The input unit 170 includes a voice input unit to input voice signals.

The control unit 180 may include an Integrated Circuit (IC), such as a mobile station modem chip, and preferably includes a RF signal processor 115 to process radio frequency signals received in the RF communication unit 110, a location signal processor 125 to process a location signal received by the location signal receiver 120, and the system list management unit 140.

The control unit 180 starts to search the MRU list upon turning on a mobile communication terminal having the system acquisition apparatus 100. The control unit 180 searches, if the system is not acquired by searching the MRU list, in an order of closeness of a system to the calculated current location based on location signals received by the location signal receiver 120 and location coordinate information of the PRL.

The control unit 180 preferably arrays the PRL prior to a search. The control unit 180 controls the system list management unit 140 to array a system list of the system list storage unit 130. The system list is arrayed in the order of closeness of systems to the calculated current location based on location signals received by the location signal receiver 120 and location coordinate information of the PRL. The control unit 180 can exclude a system that is unavailable from the current location, that is, a system having a coordinate value that is outside an allocated boundary, from a search object or from a system list. The control unit 180 preferably searches the systems in the arrayed order.

The control unit 180 transforms a state of the mobile communication terminal into an idle state and runs the timer 190 if a system is acquired when searching the MRU list. The control unit 180 controls the system list management unit 140 to array the system list of the system list storage unit 130 in the order of closeness of a system to the calculated location, which is calculated from location signals received by the location signal receiver 120 upon termination of the timer 190. The control unit 180 arrays the system list in the order of closeness of a system to the calculated current location.

The control unit 180 starts to search the MRU when disconnecting with a base station. The control unit 180 searches the PRL if a system is not acquired by searching the MRU list. The PRL may already have been arrayed prior to disconnection with a base station according to a regular system array.

The control unit 180 searches, if a system is not acquired by searching the MRU, the PRL is ordered by closeness of a system to the calculated current location based on location signals received by the location signal receiver 120 and system coordinate information of the PRL. The control unit 180 arrays the PRL prior to searching the PRL. The system list of the system list storage unit 130 is preferably arrayed in the order of closeness of a system to the calculated current location by the system list management unit 140 by control of the control unit 180 based on location signals received by the location signal receiver 120 and system coordinate information of the PRL. The control unit 180 excludes a system that is unavailable from the current location, that is, a system having a coordinate value located outside allotted boundary, from a search object or from the system list. The control unit 180 searches the system by the arrayed order.

The control unit 180 moves the terminal state into an idle state and runs the timer 190 if a system is acquired while searching the MRU list or the PRL. The control unit 180 controls the system list management unit 140 to array the location list of the system list storage unit 130 in order of closeness of a system location to the calculated location calculated from location signals received in the location signal receiver 120 upon termination of the timer 190.

Although not described above, the system acquisition apparatus 100 preferably includes units having supplementary functions, such as a storage medium insert unit enabling data storage by inserting an external storage medium such as a memory card; a broadcasting receive module; an audio signal output apparatus such as a speaker; a connecting terminal for an external digital device; a terminal for charge; a module for reproducing digital sound such as an MP3 module; and a module for an electronic commercial transaction or mobile banking.

Figure 2:
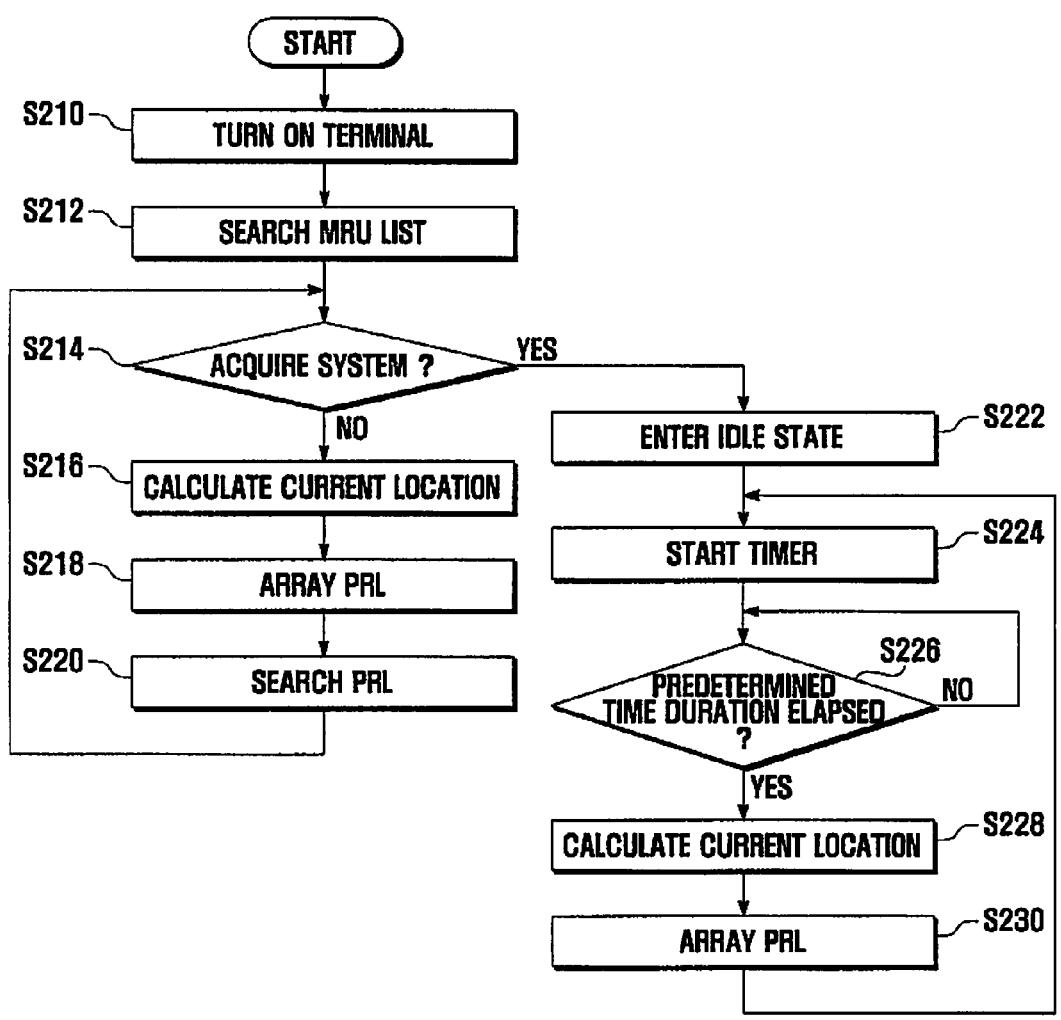
FIG. 2 is a flowchart illustrating a method for acquiring a system in a mobile communication terminal according to another exemplary embodiment of the present invention.

FIG. 2 is a flowchart illustrating a method for acquiring a system in a mobile communication terminal according to another exemplary embodiment of the present invention. Referring to FIG. 2, when the mobile communication terminal is turned on (Step 210), the control unit 180 searches a MRU list to acquire a system in Step 212. The control unit 180 determines whether a system is acquired in Step 214. If a system is not acquired, the control unit 180 calculates the current location of the mobile communication terminal (Step 216) and arrays the systems of a PRL in order of closeness of a system to the calculated current location in Step 218.

After performing step S218, the control unit 180 searches the systems of the arrayed PRL in the arrayed order in Step 220.

In another embodiment Step 218 may be omitted, and the control unit 180 searches the non-arrayed list of systems of the PRL in order of closeness of a system to the current location at Step 220.

The PRL includes coordinate information of locating points of the systems for arraying or for searching according to the current location. The control unit 180 excludes a system that is unavailable from the current location while arraying from a search object or from the PRL. That is, information may be added to exclude a system having a coordinate value at the current location as a search object or to delete a system having a coordinate value at the current location from a search list. After searching the system list of the PRL at Step 220, the process returns to Step 214. If a system is acquired at Step 214, either from searching the MRU list at Step 212 or from searching of the PRL at Step 220, the mobile communication terminal enters an idle state (Step 222) and the control unit 180 starts the timer 190 in Step 224. The control unit 180 determines from the timer 190 whether a predetermined time duration has elapsed in Step 226, and when the predetermined time duration has elapsed, the control unit 180 calculates the current location of the mobile communication terminal in Step 228. The control unit 180 then arrays the systems of the PRL in order of closeness of a system to the calculated current location in Step 230. When the PRL system array is complete, the process returns to Step 224 and the control unit 180 restarts the timer 190.

Figure 3:
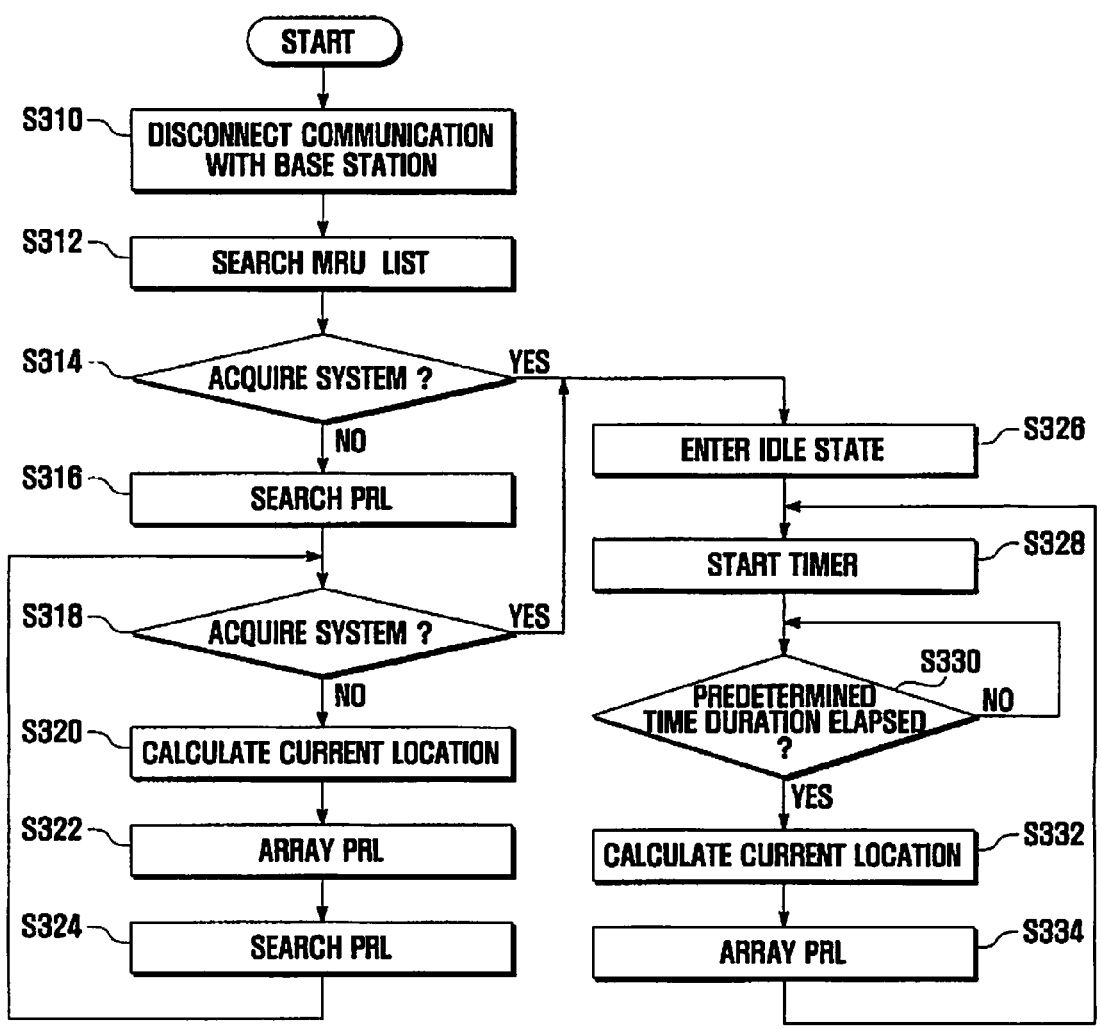
FIG. 3 is a flowchart illustrating a method for acquiring a system in a mobile communication terminal according to another exemplary embodiment of the present invention.

FIG. 3 is a flowchart illustrating a method for acquiring a system in a mobile communication terminal according to another exemplary embodiment of the present invention. Referring to FIG. 3, when the mobile communication terminal disconnects from a base station (Step 310), the control unit 180 searches an MRU list for acquiring a system in Step 312. The control unit 180 determines whether a system is acquired in Step 314. If a system is not acquired, the control unit 180 searches a PRL to acquire a system in Step 316. The control unit 180 then determines whether a system is acquired by searching the PRL in Step 318. If a system is not acquired by searching the PRL, the control unit 180 calculates the current location of the mobile communication terminal (Step 320), and arrays the systems of the PRL in order of closeness of a system to the calculated current location in Step 322. After performing Step 322, the control unit 180 searches the systems of the arrayed PRL in the arrayed order in Step 324.

In another embodiment, Step 322 may be omitted, and the control unit 180 searches the non-arrayed list of systems of the PRL according to the closeness of a system to the current location at Step 324. The PRL includes coordinate information of locating points of the systems for arraying or for searching according to the current location. The control unit 180 excludes a system that is unavailable from the calculated current location during arraying from a search object or from the PRL. That is, information may be added to exclude or delete a system having a coordinate value located outside an allotted boundary at the current location from a search object or a search list.

If a system is acquired at Step 314 by searching the MRU list at Step 312, or if a system is acquired at Step 318 by searching the PRL at Steps 316 or 324, the mobile communication enters an idle state (Step 326) and the control unit 180 starts the timer 190 in Step 328. The control unit 180 determines from the timer 190 whether a predetermined time duration has elapsed (Step 330), and when the predetermined time duration has elapsed, the control unit 180 calculates the current location of the mobile communication terminal in Step 332.

The control unit 180 then arrays the systems of the PRL in order of closeness of a system to the calculated current location in Step 334. When the PRL system array is complete, the process returns to step S328 and the control unit 180 restarts the timer 190.

Further, the control unit 180 can transform the state of a mobile communication terminal into a power-saving mode after the predetermined time has elapsed at Step 330, since the state of the mobile communication terminal is transformed into an idle state at Step 326. The control unit 180 performs an array of the PRL on a regular basis according to the current location calculation in a power-saving mode.

A partial process or a full process from Steps 310 to 334 of the method of FIG. 3 may be performed in any of the processes from Step 210 to Step 230 of the method of FIG. 2. For example, if a base station is disconnected while arraying the PRL at Step 218 of FIG. 2, Steps 310 through 324 of FIG. 3 can be performed. In another example, if a base station is disconnected while running the timer 190 at Step 224 of FIG. 2, Steps 310 through 318 of FIG. 3, or Steps 326 through 334 of FIG. 3 can be performed. Therefore, the searched PRL at Step 316 may be arrayed according to the order of the previous PRL array. That is, the PRL is arrayed according to the system closeness order at the calculation of the last location and in order of closeness of a system to the most recently calculated location by the PRL array prior to disconnection with the base station.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

As described above, a method and an apparatus for acquiring a system in a mobile communication terminal according to the present invention can quickly acquire a system through searching a search order of the PRL in order of closeness of a system to the current location and through arraying the search order of the PRL by the system closeness order at the current location on a regular basis. The present invention can reduce time, energy and wireless resource consumption by excluding the unnecessary system that is unavailable from the current location from a search list. Particularly, the present invention offers a convenient effect when a mobile communication terminal is located in an overlap system, and moves across the border of two different systems.

What is claimed is:

1. An apparatus for acquiring a system in a mobile communication terminal, the apparatus comprising:
   a Radio Frequency (RF) communication unit for transmitting and receiving a radio frequency signal;
   a location signal receiver for receiving a location signal;
   a system list storage unit for storing a system list to be searched for acquiring a system;

a system list management unit that arrays the system list stored in the system list storage unit based on location signals received by the location signal receiver;

a timer that starts at a predetermined time interval to indicate elapse of the predetermined time duration; and a control unit for acquiring the system by searching the system list stored in the system list storage unit for a closest system to a current calculated location of the mobile communication terminal from the location signal received by the location signal receiver, wherein the control unit arrays the system list in order of geographical closeness of the systems to the current calculated location based on the received location signal, and searches the system list in order of the arrayed system list, wherein the system list includes a Most Recently Used (MRU) list and a Preferred Roaming List (PRL), which include coordinate information of a system location, and wherein the control unit starts the timer upon transforming the state of the mobile communication terminal into the idle state, and controls the system list management unit to array, upon elapse of the predetermined time duration, the system list stored in the system list storage unit in the order of closeness of systems to the current calculated location.

2. The apparatus of claim 1, wherein the location signal receiver receives location information from a Global Positioning System (GPS) satellite, including an almanac and an ephemeris.

3. The apparatus of claim 1, wherein the control unit searches the MRU list upon turning on the mobile communication terminal.

4. The apparatus of claim 3, wherein the control unit searches, if a system is not acquired by searching the MRU list, the PRL in an order of closeness of systems to the current calculated location based on the location signal received by the location signal receiver and coordinate information of the system in the PRL.

5. The apparatus of claim 1, wherein the control unit transforms the state of the mobile communication terminal into the idle state upon acquiring a system by searching the MRU list.

6. The apparatus of claim 1, wherein the control unit controls, if a system is not acquired by searching the MRU list, the system list management unit to array the system list stored in the system list storage unit in the order of closeness of systems to the current calculated location based on the location signal received by the location signal receiver and coordinate information of the systems in the PRL, and to search the systems by the arrayed order.

7. The apparatus of claim 1, wherein the control unit searches the MRU list upon disconnecting with a base station, and searches, if a system is not acquired by searching the MRU list, the PRL.

8. The apparatus of claim 7, wherein the control unit searches, if a system is not acquired by searching the MRU, the PRL in order of closeness of systems to the current calculated location based on the location signal received by the location signal receiver and coordinate information of the system in the PRL.

9. The apparatus of claim 7, wherein the control unit transforms the state of the mobile communication terminal into the idle state if a system is acquired by searching the MRU list.

10. The apparatus of claim 8, wherein the control unit transforms a state of the mobile communication terminal into an idle state if a system is acquired by searching the PRL.

11. A method for acquiring a system in a mobile communication terminal, the method comprising:

searching, upon turning on the mobile communication terminal, systems that were used most recently;

calculating, if a system is not acquired by searching the most recently used systems, a current location of the mobile communication terminal;

arraying, by a system list management unit, a system list stored in a system list storage unit, based on location signals received by a location signal receiver, in order of geographical closeness of the system to the calculated current location based on the current location of the mobile communication terminal;

searching systems in order of the arrayed system list;

transforming, if a system is acquired by searching the systems, a state of the mobile communication terminal into an idle state; and running a timer at a predetermined time interval to indicate elapse of a predetermined time duration in the idle state of the mobile communication terminal, wherein the system list includes a Most Recently Used (MRU) list and a Preferred Roaming List (PRL), which include coordinate information of a system location, and wherein a control unit starts the timer upon transforming the state of the mobile communication terminal into the idle state, and controls the system list management unit to array, upon elapse of the predetermined time duration, the system list stored in the system list storage unit in the order of closeness of systems to the current calculated location.

12. The method of claim 11, wherein searching systems in the order of the arrayed system list comprises:

arraying the Preferred Roaming List (PRL) in order of closeness of the systems to the calculated current location; and searching the systems in order of the arrayed PRL.

13. The method of claim 11, wherein, in searching systems that were used most recently, the systems are searched in an order of closeness to a calculated current location based on coordinate information of the system location.

14. The method of claim 11, further comprising:

calculating, upon elapse of the predetermined time duration, the current location.

15. A method for acquiring a system in a mobile communication terminal, comprising:

searching, upon disconnecting from a base station, systems that were used most recently;

searching, if a system is not acquired by searching the most recently used systems, systems to be roamed;

calculating, if a system is not acquired by searching the systems to be roamed, a current location of the mobile communication terminal;

arraying, by a system list management unit, a system list stored in a system list storage unit, based on location signals received by a location signal receiver, in order of geographical closeness of the system to the calculated current location based on the current location of the mobile communication terminal;

searching systems in an order of the arrayed system list;

transforming, if a system is acquired, a state of the mobile communication terminal into an idle state; and running a timer at a predetermined time interval to indicate elapse of a predetermined time duration in the idle state of the mobile communication terminal, wherein the system list includes a Most Recently Used (MRU) list and a Preferred Roaming List (PRL), which include coordinate information of a system location, and wherein a control unit starts the timer upon transforming the state of the mobile communication terminal into the idle state, and controls the system list management unit to array, upon elapse of the predetermined time duration, the system list stored in the system list storage unit in the order of closeness of systems to the current calculated location.

16. The method of claim 15, further comprising:
calculating, upon elapse of the predetermined time duration, the current location.

17. The method of claim 15, wherein searching systems in the order of the arrayed system list comprises:
arraying the Preferred Roaming List (PRL) in order of closeness of a system to the calculated current location; and
searching the systems in order of the arrayed PRL.

18. The method of claim 17, wherein the PRL includes coordinate information of the system location.

19. The method of claim 15, wherein, when searching of systems to be roamed, the systems to be roamed are arrayed according to a last calculated location prior to disconnection with a base station.

* * * * *